United States Patent
Becker et al.

(10) Patent No.: US 6,337,694 B1
(45) Date of Patent: Jan. 8, 2002

(54) METHOD AND SYSTEM FOR VARIABLE SPEED SCROLLING WITHIN A DATA PROCESSING SYSTEM

(75) Inventors: Craig Henry Becker, Austin, TX (US); David Wayne Glass, Georgetown, KY (US); Michael David Hocker, Staatsburg, NY (US); James Gordon McLean, Fuguay-Varina, NC (US); Clifford Alan Pickover, Yorktown Heights, NY (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/392,759

(22) Filed: Sep. 7, 1999

(51) Int. Cl.[7] ................................................. G09G 5/36
(52) U.S. Cl. ..................................... 345/684; 345/785
(58) Field of Search ................................. 345/684, 685, 345/686, 687, 688, 784, 785, 786, 787, 830, 660

(56) References Cited

U.S. PATENT DOCUMENTS

| | | | |
|---|---|---|---|
| 4,841,454 A | * 6/1989 | Awazu | 364/521 |
| 5,256,067 A | * 10/1993 | Gildea et al. | 434/169 |
| 5,434,591 A | 7/1995 | Goto et al. | 345/123 |
| 5,495,566 A | 2/1996 | Kwatinetz | 395/157 |
| 5,530,455 A | 6/1996 | Gillick et al. | 345/163 |
| 5,592,195 A | 1/1997 | Misono et al. | 345/146 |
| 5,874,957 A | 2/1999 | Cline et al. | 345/339 |
| 5,874,961 A | 2/1999 | Bates et al. | 345/341 |
| 6,043,809 A | * 3/2000 | Holehan | 345/168 |

* cited by examiner

Primary Examiner—Dennis-Doon Chow
(74) Attorney, Agent, or Firm—Robert M. Sullivan; Bracewell & Patterson, L.L.P.

(57) ABSTRACT

A method and system for variable speed scrolling through a viewable object within a data processing system such as a computer, a television, a kiosk display or hand-held digital product. A portion of the viewable object is displayed within a display window within a data processing system in conjunction with a scroll bar having a slider and one or more scroll buttons associated therewith or some other suitable method of controlling video or audio displays. User selection of the slider or a scroll button initiates scrolling of the viewable object so that additional portions of the viewable object may be displayed. As the viewable object is scrolled, the scroll speed is dynamically varied in response to the content of the viewed portion of the viewable object. For example, the scroll speed can vary in response to the type of objects displayed within the viewable object, the number and location of hotlinks or hyperlinks within the viewable object and/or the amount and number of previous viewings of the various portions of the viewable object by the user.

22 Claims, 4 Drawing Sheets

METHOD AND SYSTEM FOR VARIABLE SPEED SCROLLING WITHIN A DATA PROCESSING SYSTEM

BACKGROUND OF THE INVENTION

1. Technical Field

The present invention relates in general to an improved data processing system and in particular to an improved graphical user interface within a data processing system. Still more particularly, the present invention relates to a method and system for variable speed scrolling of a viewable object within a data processing system.

2. Description of the Related Art

A graphical user interface is a type of display format which enables a user to choose commands, make selections, start programs, and see lists of files and other options by pointing to a pictorial representation and lists of menu items on a computer display screen, television, kiosk display or hand-held digital products. Choices may generally be activated by either a keyboard or a pointing device, such as a mouse. A mouse is a commonly used pointing device, containing one or more buttons and possibly a scroll knob, that permits a user to interact with a product or operating environment such as a graphical user interface. Of course, other methods may be utilized to interact with such an interface, including a stylus, a human finger or voice commands.

Some conventional graphical user interfaces provide a cursor and a scroll bar for scrolling through portions of a viewable object. A viewable object can contain multiple components such a spreadsheets, text, hotlinks or hyperlinks, pictures, sound and video objects. However, a viewable object is not limited to these components. In many instances of graphical user interfaces a vertical or horizontal bar at the side or bottom of a graphical user interface window may be utilized in conjunction with a pointing device such as a mouse, track ball or stylus to move about in a viewable object. Scrolling permits viewing of any desired portion of a viewable object and is so named because it is the electronic equivalent of reading through a rolled (i.e., scrolled) viewable object rather than flipping through pages of a book. A vertical scroll bar is usually utilized to control up and down movement (e.g., through lines and pages of a viewable object), while a horizontal scroll bar controls movement across a viewable object.

Conventional scroll bar systems commonly include two arrows or scroll buttons and a slider. Each arrow or scroll button controls which direction a user desires to scroll through a viewable object. A scroll button conventionally controls movement through a viewable object in small increments or small blocks of information, such as individual lines or page of a viewable object, for example. Moreover, if an arrow associated with a scroll button points in an upward direction, the viewable object can be scrolled from its present position toward the first page of the viewable object. If an arrow associated with a scroll button points in a downward position, the viewable object can be scrolled from its present position towards the last page of the viewable object. Of course, information presented in a window need not be associated with discrete pages, and scrolling may simply display or represent different regions of the information which may be text, audio, images, animations, or 3-D graphics such as a drawing of an engine in a CAD or virtual reality environment.

A slider is also typically utilized to control movement through a viewable object in larger increments than when the arrows are utilized. Instead of incrementing by small blocks of information, the slider typically controls movements through a viewable object in larger blocks, increments or groups of information, such as two or more pages, for example. Therefore, when a user desires to go from the first page of a viewable object to the fiftieth page, the slider is usually selected and moved until the fiftieth page is selected. The term "elevator" is particularly used sometimes to describe a slider that operates of a vertical scroll bar. The term "puck" is also utilized to describe a slider which also operates on a horizontal scroll bar.

When a large, viewable object, such as a large list of items, is accessed by a user via a graphical user interface, the scroll bar slider often represents only a small portion of the viewable object. When the slider is grabbed and moved by the user utilizing a pointing device such as a mouse, the viewable object scrolls too quickly, even for small movements of the slider, making it difficult for the user to locate a desired section of the viewable object. Even expert mouse users, for example, can become frustrated when attempting to utilize today's sliders on large viewable objects. The problem is even more acute for less-adept users.

Current solutions to the problems associated with accessing large viewable objects typically provide an index bar from which the user may select an area of the viewable object to search. However, such solutions do not provide fluid scanning of the viewable object. An index bar, for example, merely allows the user to jump to a particular region of a viewable object without reference to a previous region. Index bars do not permit a user to scroll to a desired regions of a viewable object and thereafter focus a search at multiple levels within the desired regions.

With respect to the foregoing needs, it should therefore be apparent that a need exists for a method and system which permits a user to initiate variable speed scrolling through a large viewable object within a data processing system in a manner which permits access of desirable data within that viewable object in an efficient manner.

SUMMARY OF THE INVENTION

It is therefore one object of the present invention to provide an improved data processing system.

It is another object of the present invention to provide an improved graphical user interface within a data processing system.

It is yet another object of the present invention to provide an improved method and system for variable speed scrolling of a viewable object within a data processing system.

The foregoing objects are achieved as is now described. A method and system are disclosed for variable speed scrolling through a viewable object within a data processing system such as a computer, a television, a kiosk display or hand-held digital product. A portion of the viewable object is displayed within a display window within a data processing system in conjunction with a scroll bar having a slider and one or more scroll buttons associated therewith or some other suitable method of controlling video or audio displays. User selection of the slider or a scroll button initiates scrolling of the viewable object so that additional portions of the viewable object may be displayed. As the viewable object is scrolled, the scroll speed is dynamically varied in response to the content of the viewed portion of the viewable object. For example, the scroll speed can vary in response to the type of objects displayed within the viewable object, the number and location of hotlinks or hyperlinks within the viewable object and/or the amount and number of previous viewings of the various portions of the viewable object by the user.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
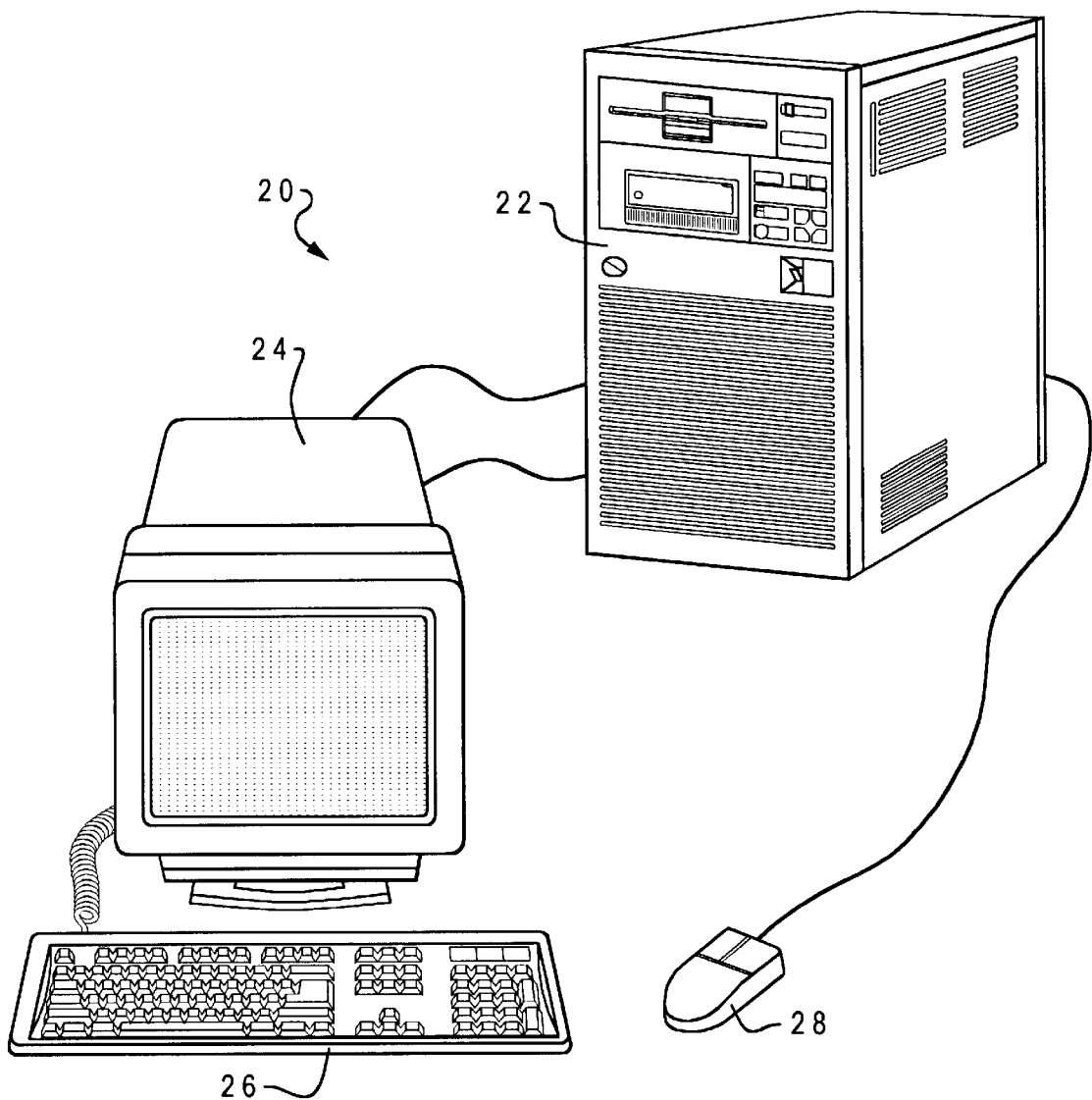
FIG. 1 illustrates a pictorial representation of a data processing system which may be utilized to implement the method and system of the present invention.

With reference now to the figures and in particular with reference to FIG. 1, there is depicted a pictorial representation of a computer system which may be utilized to implement the method and system of the present invention. A computer system 20 is depicted which includes a system unit 22, video display terminal 24, a keyboard 26, and a mouse 28. Computer system 20 may be implemented utilizing any suitable computer such as the AS/400 computer system or the "Aptiva" computer system, both products of International Business Machines Corporation of Armonk, New York. However, those skilled in the art will appreciate that the mechanisms and apparatus of the present invention apply equally to any computer system, regardless of whether the computer system is a complicated multi-user computing apparatus or a single-user workstations.

Figure 2:
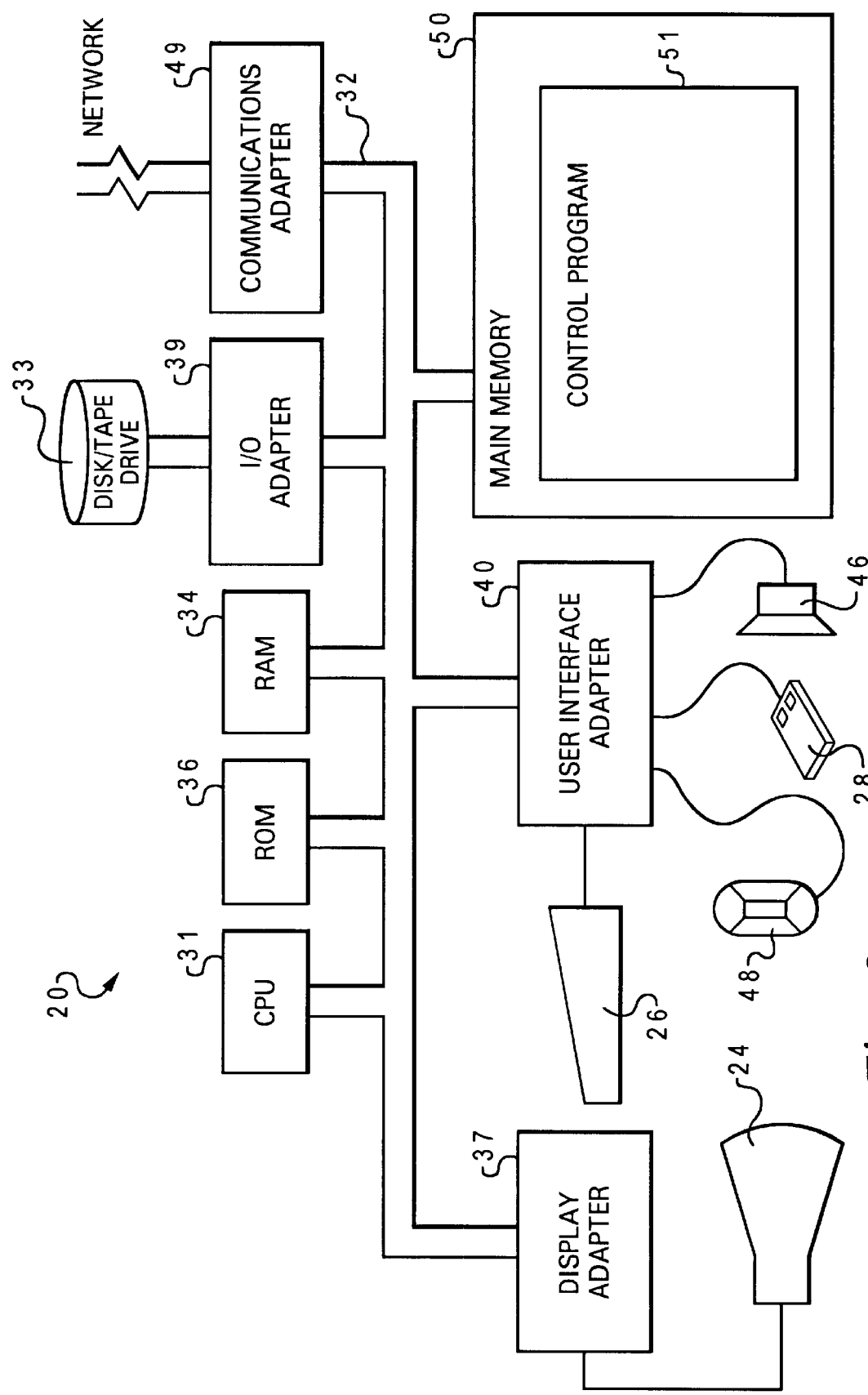
FIG. 2 depicts a high level block diagram of a representative hardware environment of the data processing system of FIG. 1.

Referring now to FIG. 2, there is depicted a high level block diagram of a representative hardware environment of the data processing system of FIG. 1. As illustrated, system unit 22 preferably includes a central processing unit (CPU) 31, such as a conventional microprocessor, and a number of other units interconnected via system bus 32. Computer system 20 preferably includes random-access memory (RAM) 34, read-only-memory (ROM) 36, display adapter 37 for connecting system bus 32 to video display terminal 24 and input/output adapter 39 for connecting peripheral devices (e.g., disk and tape drives 33) to system bus 32.

Video display terminal 24 is the visual output of computer system 20. Video display terminal 24 can be, for example, a cathode ray tube based video display well known in the art of computer hardware. However, with a portable of notebook-based computer, video display terminal 24 may be replaced with a liquid crystal display based or gas plasma-based flat-panel display. Computer system 20 further includes a user interface adapter 40 for connecting keyboard 26, mouse 28, speaker 46, microphone 48 and/or other user interface devices, such as a touch screen device (not shown), to system bus 32. Communications adapter 49 can also be utilized to connect computer system 20 to a computer network. Although computer system 20 is shown to contain only a single CPU and a single system bus, it should be understood that the present invention applies equally to computer systems which possess multiple CPUs and to computer systems which include multiple buses that each performs different functions in different manners.

Computer system 20 also preferably includes an interface such as a graphical user interface which resides within machine-readable media to direct operation of computer system 20. Any suitable machine-readable media may contain the graphical user interface, such an RAM 34, ROM 36, a magnetic diskette, magnetic tape, or an optical disk (the last three being located within disk/tape drives 33). Any suitable operating system and associated graphical user interface may direct CPU 31. For example, the AIX operating system and the AIX Windows windowing system (i.e., graphical user interface) can be utilized to direct CPU 31. The AIX operating system is IBM's implementation of the UNIX operating system. UNIX is a trademark of UNIX Systems Laboratories, Inc. Other technologies may also be utilized in conjunction with CPU 31, such as touch-screen technology or human voice control. Those skilled in the art will appreciate that the hardware depicted in FIG. 2 may vary for specific applications. For example, other peripheral devices such as optical disk media, audio adapters or chip-programming devices, such as PAL or EPROM programming devices well known in the art of computer hardware, and the like may be utilized in addition to or in place of the hardware already depicted.

Main memory 50 is also depicted connected to system bus 32 and includes control program 51. Control program 51 resides within main memory 50 and contains instructions that when executed on CPU 31 carry out the operations depicted in the logical flowcharts of FIGS. 4 and 5 described herein. This "computer program product" can also be referred to as a "program product."

It is important that, while the present invention has been (and will continue to be) described in the context of a fully functional computer system, those skilled in the art appreciate that the present invention is capable of being distributed as a program product in a variety of forms, and the present invention applies equally regardless of the particular type of signal-bearing media utilized to actually carry out the distribution. Examples of signal-bearing media include: recordable-type media, such as floppy disks, hard disk drives and CD-ROMs, and transmission-type media such as digital and analog communication links.

Figure 3:
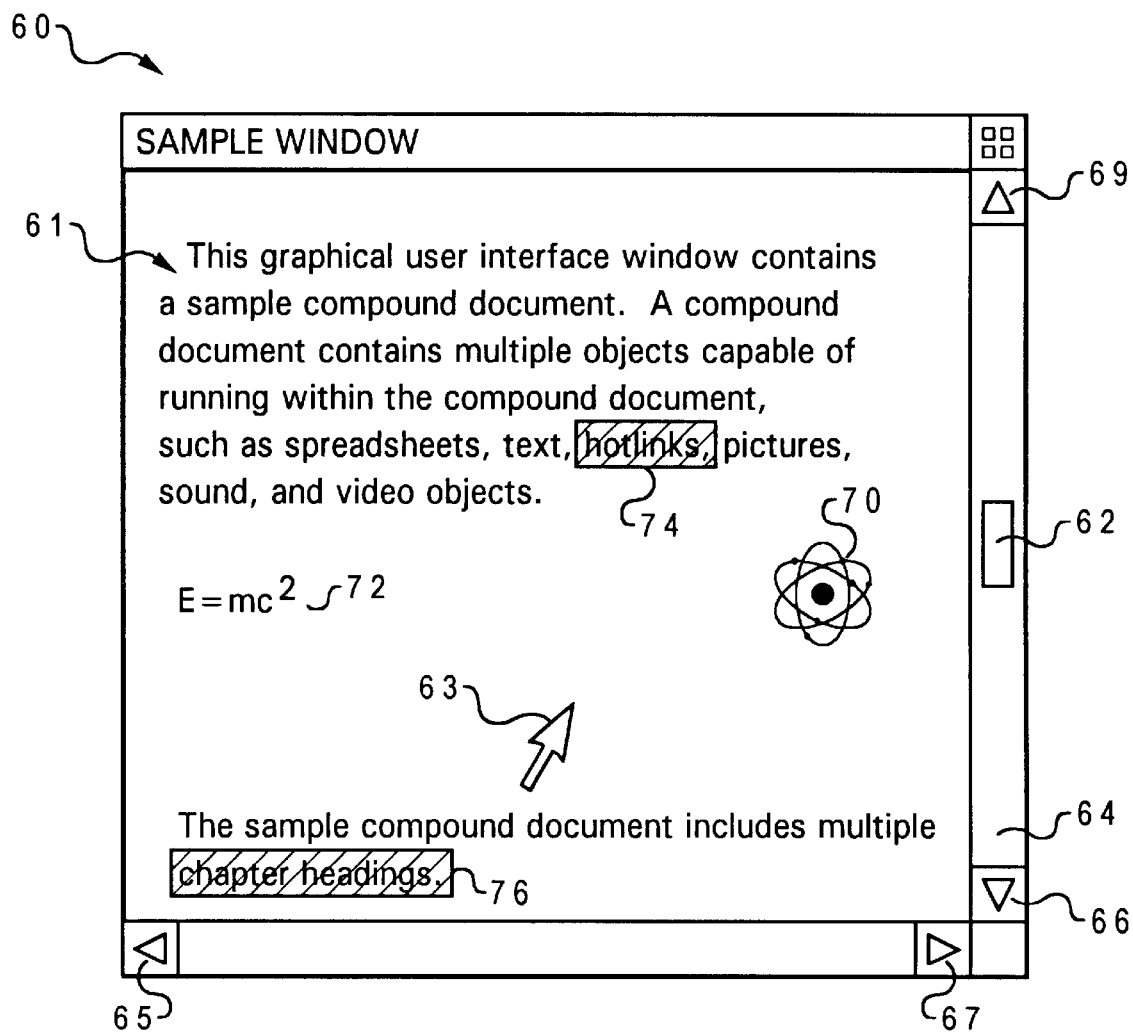
FIG. 3 illustrates a pictorial representation of a graphical user interface window which may be utilized to implement the method and system of the present invention.

With reference now to FIG. 3, there is illustrated a pictorial representation of a graphical user interface window 60 which may be utilized to implement the method and system of the present invention. Window 60 displays a portion of a viewable object, such as document 61. Document 61 is a viewable object which contains multiple components, such as spread sheets, text, hotlinks or hyperlinks, pictures, sound and video objects. The size and position of slider 62 within scroll bar 64 corresponds to the size and position of the current viewable page in relation to the entirety of document 61. The current viewable page is contained within a viewable window area within window 60. As illustrated, document 61 may include graphical objects such as graphical object 70, mathematical formulae such as formula 72, hotlinks or hyperlinks, as indicated at reference numerals 74 and 76 and also audio or video objects (not shown).

Because document 61 includes too many pages to view simultaneously, the user may position a mouse cursor 63 over scroll buttons 69 and 66 of scroll bar 64 and click a pointing device (e.g., a mouse) to scroll the document upward or downward, as appropriate. Scrolling in this manner permits viewing of any desired portion of document 61. Scrolling is the electronic equivalent of reading through a rolled (i.e. "scrolled") document rather than flipping through the pages of a book.

As illustrated in FIG. 3, the graphical user interface window 60 sizes slider 62 within scroll bar 64 according to the number of pages within document 61. Then length of slider 62 is small with respect to the length of scroll bar 64 because it represents one of many pages of document 61. Similarly, the graphical user interface positions slider 62 within scroll bar 64 relative to the viewable position of document 61. For example, the graphical user interface positions slider 62 at the top of scroll bar 64 when the user is viewing the first page of document 61, and at the bottom of scroll bar 64 when the user is viewing the last page of document 61. Slider 62 within scroll bar 64 is typically defined to have a minimum size at all times.

As described above, with a large viewable object such as document 61 the scrolling through that document utilizing continuous selection of scroll buttons 66 and 69 or the dragging of slider 62 can sometimes present problems even to a skilled user. Consequently, it would be useful to have a method and system whereby the speed at which document 61 scrolls through window 60 may be dynamically varied in response to a continuous selection of scroll buttons 66 or 69 or the dragging of slider 62. Additionally, the speed at which document 61 scrolls through window 60 may be dynamically varied in is response to a "continuous" scrolling provided by other means such as voice commands, dials on mice, fingers or a stylus movement on a touch-sensitive screen, or dragging a mouse cursor over the window."

Figure 4:
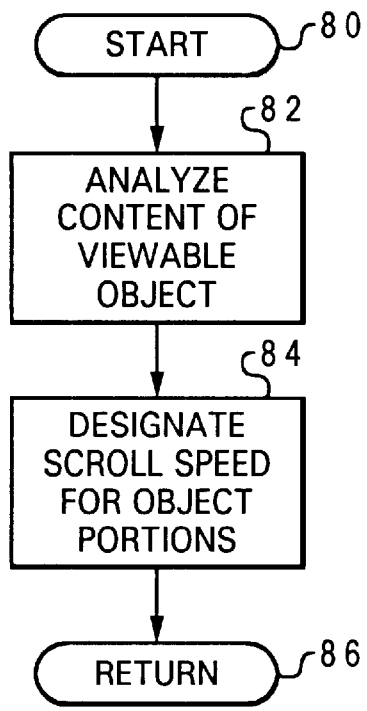
FIG. 4 depicts a high level logic flowchart illustrating an analysis of a viewable object within the data processing system of FIG. 1 in accordance with the method and system of the present invention.

Referring now to FIG. 4, there is depicted a high level logic flowchart which illustrates an analysis of a viewable object within the data processing system of FIG. 1 in accordance with the method and system of the present invention. As illustrated, this process begins at block 80 and thereafter passes to block 82. Block 82 depicts the examination of the content of a viewable object, such as document 61. By "content" what is meant in the context of the present invention is the types of objects contained within document 61, the number and placement of hotlinks or hyperlinks within document 61 or the record of previous accesses of document 61 by a user, indicating the duration and location of portions of document 61 which have been displayed in the past. Content may also refer to the nature of the information being presented, such as the topic of the textual descriptions, figures, animation, and audio. Topics might include: sports, household appliances, financial data, science, commercial advertisements, text written by particular authors, the presence of keywords, the presence of certain graphical objects or colors, etc. Thereafter, the process passes to block 84.

Block 84 illustrates the designation of scroll speed within a viewable object associated with each portion of the object. Scrolling speed, as described above, can vary with the content of the information being scrolled; for example, certain content may be more important, more difficult to understand, or of greater interest to a user. If the content is a graphical representation, for example, of an engine part, the scrolling may proceed slower when more intricate sections are being displayed than when simple sections are displayed. If the content corresponds to audio, the scrolling may be slower over more important audio sections than less important audio sections or differentiate content such as music, speech, commercial advertisements. If the content is text, the scrolling may be slower over difficult text passages or important text passages that are relevant to a user's needs. The content and nature of the text may be reflected in the scroll rate. For example, if a user is interested in automobiles, information regarding automobiles may scroll slower than information corresponding to bikes. Advertisers may actually pay users, web-browser manufacturers, and other groups to provide a slower scroll when an advertisement is being presented. If a user has in the past studied (e.g., viewed) a certain section of the text for a long period of time, the system may scroll slower when this region of information is viewed. The process then passes to block 86 and returns.

Figure 5:
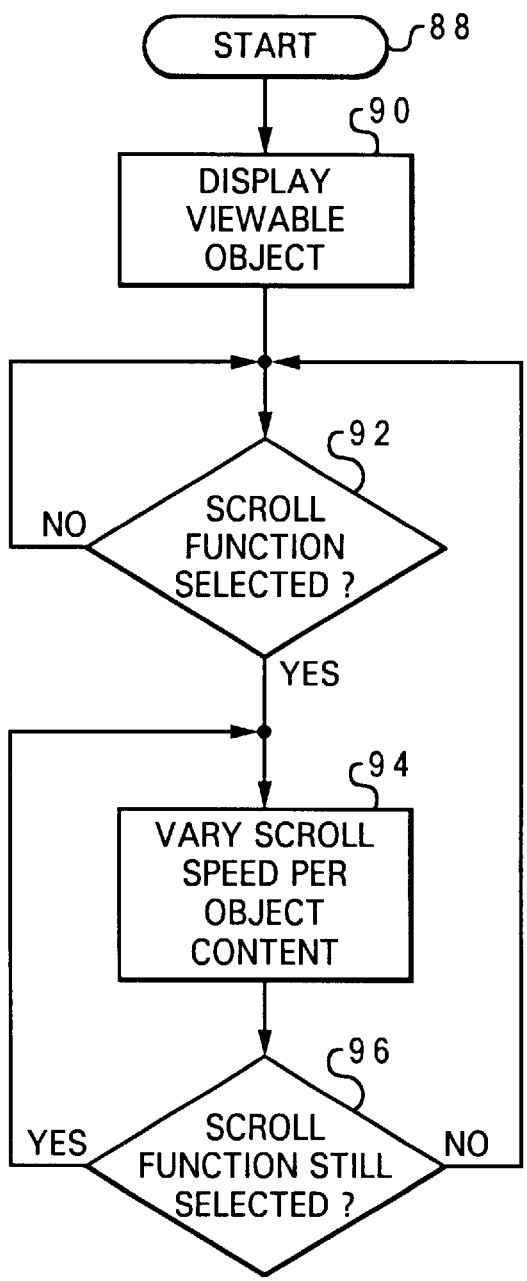
FIG. 5 illustrates a high level logic flowchart depicting variable speed scrolling of a viewable object in accordance with the method and system of the present invention.

Finally, with reference to FIG. 5, there is depicted a high level flowchart which illustrates variable speed scrolling of a viewable object in accordance with the method and system of the present invention. As illustrated, this process begins at block 88 and thereafter passes to block 90. Block 90 depicts the displaying of a viewable object, such as document 61. Next, the process paggeg to block 92.

Block 92 illustrates a determination of whether a selection of a scroll function has occurred. As described above, a scroll function may be selected by the dragging of slider 62 or the continuous selection of scroll buttons 66 or 69. Additionally, scroll functions may be selected in response to voice commands, fingers or stylus movement on a touch-sensitive screen, or the dragging of a cursor over a window in a manner well-known to those having ordinary skill in the art. In the event a scroll function has not been selected, the process returns, in an iterative fashion to block 92, to await selection of a scroll function by a user.

Still referring to block 92, in the event a scroll function has been selected, the process passes to block 94. Block 94 illustrates the varying of the scroll speed at which document speed at which document 61 scrolls through window 60 in accordance with the content of various portions of document 61.

Examples of the manner in which this association of scroll speed with document content can be accomplished are described above and may include the slowing of the scroll speed through those portions of document 61 which contain numerical formulae, spreadsheets or other detail rich portions of the document. Similarly, the existence and number of hotlinks or hyperlinks, such as hotlinks 74 and 76 (see FIG. 3) may also cause the scroll speed of document 61 to slow through window 60 in accordance with the method and system of the present invention. Finally, as described above, a historical use function for document 61 which indicates that certain portions of that document have been viewed more frequently than other portions will cause those portions to be scrolled slower than portions of the document which are not consistently viewed by a user. In this manner, the entire document may be scrolled rapidly and efficiently by slowing the scroll speed within those portions of document 61 which are presumed to contain data of greater interest to the user.

Next, the process passes to block 96. Block 96 illustrates a determination of whether or not slider 62 and scroll buttons 66 or 69 are still selected and if so, the process returns to block 94, in an iterative fashion, to continue to dynamically vary the scroll speed of document 61 within window 60 in the manner described above. However, if slider 62 and scroll button 66 or 69 are not still selected, the process returns, in an iterative fashion, to block 92 to await further selection of slider 62 and scroll buttons 66 or 69 as described above.

Upon reference to the foregoing, those skilled in the art will appreciate that by an analysis of each viewable object which is displayed within a scrollable window to determine the content of that document at various portions thereof, the scroll speed for scrolling through that document may be dynamically varied in a manner which enhances the efficiency of document review without requiring additional time to review the entire document.

While the invention has been particularly shown and described with reference to a preferred embodiment, it will be understood by those skilled in the art that various changes in form and detail may be made therein without departing from the spirit and scope of the invention.

What is claimed is:

1. A method of variable speed scrolling through a viewable object in a data processing system wherein said viewable object includes a plurality of hyperlinks disposed at various locations therein, said method comprising the steps of:
    displaying a portion of a viewable object within said data processing system;
    scrolling through additional portions of said viewable object in response to a user input to said data processing system; and
    dynamically varying a scroll speed of said viewable object in response to a number of hyperlinks contained within viewed portions of said viewable object.

2. The method of variable speed scrolling through a viewable object according to claim 1, wherein said step of displaying a portion of a viewable object within said data processing system comprises the step of displaying a portion of a viewable object within a window within a display of said data processing system.

3. The method of variable speed scrolling through a viewable object according to claim 2, wherein said window includes a scroll bar and wherein said step of scrolling through additional portions of said viewable object in response to a user input to said data processing system comprises the step of scrolling through additional portions of said viewable object in response to selection of a scroll button within said scroll bar by a user.

4. The method of variable speed scrolling through a viewable object according to claim 1, wherein said viewable object contains various types of displayable objects therein and wherein said step of dynamically varying a scroll speed of said viewable object in response to content of viewed portions of said viewable object comprises the step of dynamically varying a scroll speed of said viewable object in response to a type of displayable object contained within viewed portions of said viewable object.

5. A system for variable speed scrolling through a viewable object in a data processing system wherein said viewable object includes a plurality of hyperlinks disposed at various locations therein, said system comprising the steps of:
    means for displaying a portion of a viewable object within said data processing system;
    means for scrolling through additional portions of said viewable object in response to a user input to said data processing system; and
    means for dynamically varying a scroll speed of said viewable object in response to a number of hyperlinks contained within viewed portions of said viewable object.

6. The system of variable speed scrolling through a viewable object according to claim 5, wherein said means for displaying a portion of a viewable object within said data processing system comprises means for displaying a portion of a viewable object within a window within a display of said data processing system.

7. The system of variable speed scrolling through a viewable object according to claim 6, wherein said window includes a scroll bar and wherein said means for scrolling through additional portions of said viewable object in response to a user input to said data processing system comprises means for scrolling through additional portions of said viewable object in response to selection of a scroll button within said scroll bar by a user.

8. The system of variable speed scrolling through a viewable object according to claim 5, wherein said viewable object contains various types of displayable objects therein and wherein said means for dynamically varying a scroll speed of said viewable object in response to content of viewed portions of said viewable object comprises means for dynamically varying a scroll speed of said viewable object in response to a type of displayable object contained within viewed portions of said viewable object.

9. A computer program product for use in a data processing system, said computer program product comprising:
    signal bearing media adapted to be utilized within a data processing system;
    instruction means within said signal bearing media for displaying a portion of a viewable object within said data processing system wherein said viewable object includes a plurality of hyperlinks disposed at various locations therein;
    instruction means within said signal bearing media for scrolling through additional portions of said viewable object in response to a user input to said data processing system; and
    instruction means within said signal bearing media for dynamically varying a scroll speed of said viewable object in response to a number of hyperlinks contained within viewed portions of said viewable object.

10. A computer program product for use in a data processing system according to claim 9, wherein said signal bearing media comprises transmission media.

11. A computer program product for use in a data processing system according to claim 9, wherein said signal bearing media comprises recordable media.

12. A method of variable speed scrolling through a viewable object in a data processing system, said method comprising the steps of:
    displaying a portion of a viewable object within said data processing system;
    scrolling through additional portions of said viewable object in response to a user input to said data processing system; and
    dynamically varying a scroll speed of said viewable object in response to previous viewings of said viewable object by a user.

13. The method of variable speed scrolling through a viewable object according to claim 12, wherein said step of displaying a portion of a viewable object within said data processing system comprises the step of displaying a portion of a viewable object within a window within a display of said data processing system.

14. The method of variable speed scrolling through a viewable object according to claim 13, wherein said window includes a scroll bar and wherein said step of scrolling through additional portions of said viewable object in response to a user input to said data processing system comprises the step of scrolling through additional portions of said viewable object in response to selection of a scroll button within said scroll bar by a user.

15. The method of variable speed scrolling through a viewable object according to claim 12, wherein said viewable object contains various types of displayable objects therein and wherein said step of dynamically varying a scroll speed of said viewable object in response to content of viewed portions of said viewable object comprises the step of dynamically varying a scroll speed of said viewable object in response to a type of displayable object contained within viewed portions of said viewable object.

16. A system for variable speed scrolling through a viewable object in a data processing system, said system comprising the steps of:
   means for displaying a portion of a variable object within said data processing system;
   means for scrolling through additional portions of said viewable object in response to a user input to said data processing system; and
   means for dynamically varying a scroll speed of said viewable object in response to previous viewings of said viewable object by a user.

17. The system of variable speed scrolling through a viewable object according to claim 16, wherein said means for displaying a portion of a viewable object within said data processing system comprises means for displaying a portion of a viewable object within a window within a display of said data processing system.

18. The system of variable speed scrolling through a viewable object according to claim 17, wherein said window includes a scroll bar and wherein said means for scrolling through additional portions of said viewable object in response to a user input to said data processing system comprises means for scrolling through additional portions of said viewable object in response to selection of a scroll button within said scroll bar by a user.

19. The system of variable speed scrolling through a viewable object according to claim 16, wherein said viewable object contains various types of displayable objects therein and wherein said means for dynamically varying a scroll speed of said viewable object in response to content of viewed portions of said viewable object comprises means for dynamically varying a scroll speed of said viewable object in response to a type of displayable object contained within viewed portions of said viewable object.

20. A computer program product for use in a data processing system, said computer program product comprising:
   signal bearing media adapted to be utilized within a data processing system;
   instruction means within said signal bearing media for displaying a portion of a viewable object within said data processing system;
   instruction means within said signal bearing media for scrolling through additional portions of said viewable object in response to a user input to said data processing system; and
   instruction means within said signal bearing media for dynamically varying a scroll speed of said viewable object in response to previous viewings of said viewable object by a user.

21. A computer program product for use in a data processing system according to claim 20, wherein said signal bearing media comprises transmission media.

22. A computer program product for use in a data processing system according to claim 20, wherein said signal bearing media comprises recordable media.

* * * * *

UNITED STATES PATENT AND TRADEMARK OFFICE
CERTIFICATE OF CORRECTION

PATENT NO. : 6,337,694
DATED : January 8, 2002
INVENTOR(S) : Becker et al.

It is certified that error appears in the above-identified patent and that said Letters Patent is hereby corrected as shown below:

Title page,
Item [75] please delete "Fuguay-Varina" and add -- Fuquay-Varina --;

Column 6,
Line 22, please delete "paggeg" and add -- passes --.

Signed and Sealed this

Twenty-first Day of May, 2002

Attest:

Attesting Officer

JAMES E. ROGAN
Director of the United States Patent and Trademark Office